United States Patent Office 3,159,548
Patented Dec. 1, 1964

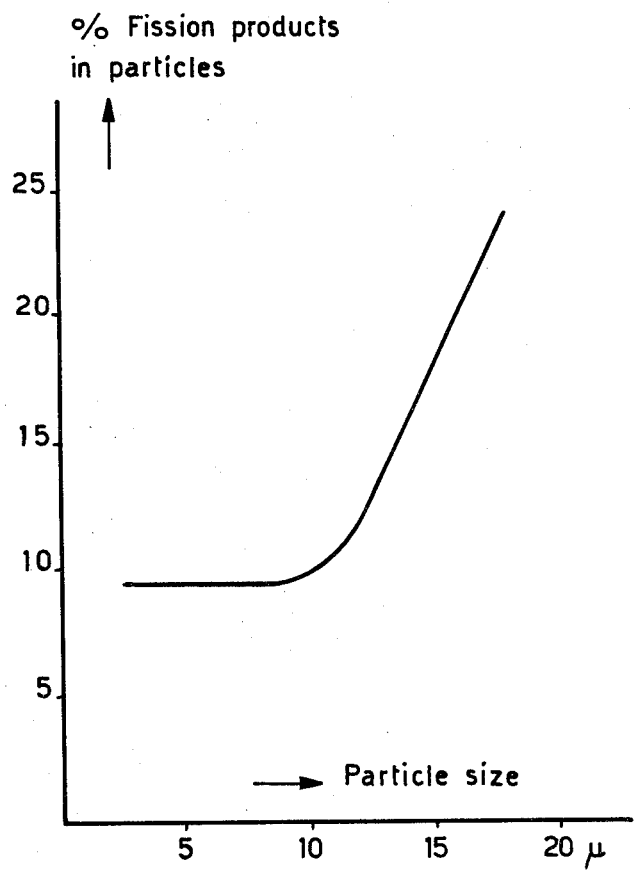

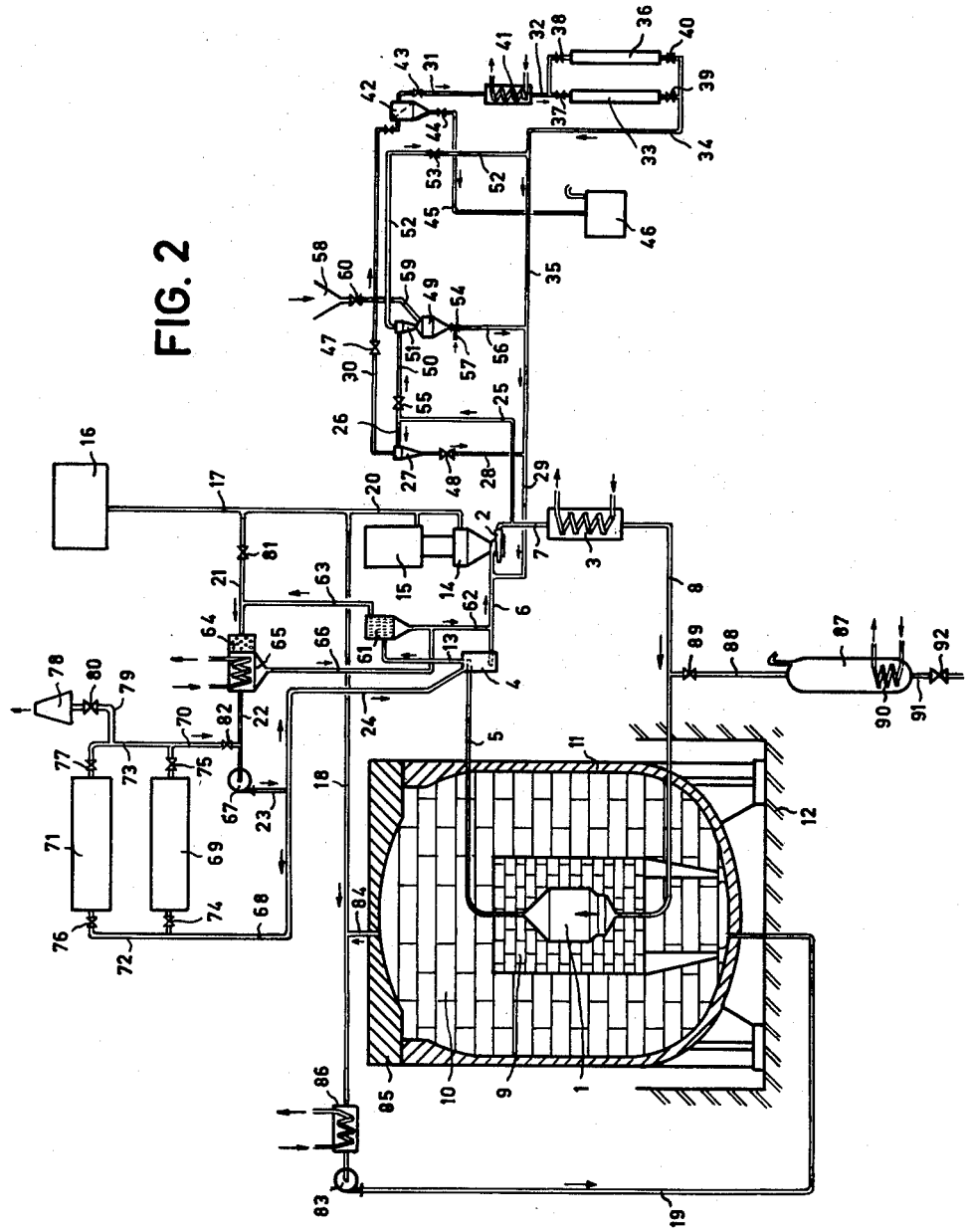

3,159,548
PROCESS OF NUCLEAR FISSION
Jan J. Went, Arnhem, Netherlands, assignor to Stichting voor Fundamenteel Onderzoek der Materie, Utrecht, Netherlands
Filed Sept. 26, 1955, Ser. No. 536,638
2 Claims. (Cl. 176—37)

The present invention relates to a process for the establishment of a self-sustaining neutron chain fission reaction in a system comprising a nuclear fuel suspension of solid fissile material particles in a carrier liquid of low neutron capture cross section.

This application is a continuation-in-part of my co-pending application, Serial No. 435,340, filed June 8, 1954, and now abandoned.

The above-mentioned process, as previously proposed, is especially suited for application with the so-called thermal power nuclear reactors, as is the case with that process for the establishment of a self-sustaining neutron chain fission reaction in a system comprising a solution of fissile material in a carrier liquid having a low neutron capture cross section, and that because the said suspension may be circulated through the nuclear reactor applied and through a heat exchanger, where the heat is conferred to a secondary coolant, e.g., water, so that the nuclear fuel suspension simultaneously acts as its own coolant, and the application of a separate coolant may be dispensed with.

In the process as hereinbefore indicated there may be used as the solid fissile material uranium oxides or thorium oxides or other insoluble solids comprising substances capable of giving rise to divergent nuclear chain fission reactions.

As the carrier liquid there may be advantageously applied liquids capable of slowing down, or moderating, fast fission neutrons into slow or thermal neutrons, e.g. common water or heavy water.

In the present process, known principles are applied in relation to the determination of the critical size of the uraniferous mass in combination with moderating and neutron-reflecting material within the nuclear reactor proper. It should be understood that in those cases where the nuclear fuel suspension circulates through the nuclear reactor and through a heat exchanger, there are no critical conditions whatsoever in the external piping system, heat exchanger included, outside of the nuclear reactor, so that the occurrence of nuclear fission is substantially confined to the space within the nuclear reactor proper.

In connection with the proposals hitherto made for the process as hereinbefore defined, there has been stated that the use of a fluid nuclear fuel provides an opportunity for continuous removal of fission products during operation of the nuclear reactor. Such continuous removal would entail the possibility of deliberately prolonging the nuclear chain in contradistinction to known processes wherein there is obligatory periodical stopping of the nuclear chain, which is a serious disadvantage with power reactors.

It is known that in the fission of atom nuclei by neutrons, fission fragments are formed which are ejected at high velocities, but are soon slowed down completely. The atom nuclei thus formed, and the atoms formed therefrom by further nuclear reactions, remain in the nuclear fuel as impurities. Owing to their neutron-capturing properties these impurities have a detrimental effect on the chain fission reaction.

For instance, fission of $U^{235}$ yields, via $I^{135}$ (half life 6.7 hours) or $Pm^{149}$ (half life 47 hours), $Xe^{135}$ and $Sm^{149}$, respectively. These latter isotopes have a very great effective capture cross section for slow neutrons.

The amount of said fission products present after some time is dependent on the neutron flux. If the neutron flux is high, as is essential in power reactors, the concentration of impurities becomes high, so that the neutron absorption very soon reaches a very considerable value. With a neutron flux of $10^{14}$ neutrons per $cm^2$ per second, it appears that the amounts of $Xe^{135}$ and $Sm^{149}$ present are so great that as much as 5.8% of the neutrons present are absorbed.

By the side of these rapidly-forming impurities, more stable fission products gradually accumulate in the nuclear fuel. As these products also tend to absorb neutrons, there could in the long run be built up such a neutron loss factor that under the conditions chosen, the chain fission reaction would be prevented from remaining self-sustaining.

This is the reason why, generally, periodical purification of the nuclear fuel is contemplated, viz. by shutting down the nuclear reactor, removing the nuclear fuel therefrom and adequately processing the nuclear fuel.

Certainly it would be useful to effectuate continuous removal of the said fission products during operation of the nuclear reactor and it could be imagined that continuous processing of at least part of the nuclear fuel suspension circulating through the nuclear reactor and through a heat exchanger would suitably serve such purpose.

It is the main object of the present invention to provide an improved process of the kind referred to permitting a highly efficient continuous removal of fission products during operation of the nuclear reactor.

It is a further object of the invention to provide a process of the kind referred to in which there is avoided, during the continuous processing hereinbefore mentioned, the simultaneous removal of atom nuclei fissionable by slow neutrons which nuclei have been newly formed by neutron capture and subsequent $\beta$-emission.

Still further objects and the entire scope of applicability of the invention will become apparent from the detailed description and examples given hereinafter, in the annexed drawing and in the appertaining claims. It should be understood, however, that the detailed description is given by way of illustration and not of limitation.

According to the invention, in the process for the establishment of a self-sustaining neutron chain fission reaction as hereinbefore defined there is applied a stable, non-agglomerating nuclear fuel suspension in which suspension substantially all the suspended particles have a minimum diameter that is smaller than $15\mu$ and the continuous removal of fission products is efficiently effected by separating at least part of the carrier liquid from the nuclear fuel suspension circulating through the external piping system, purifying the carrier liquid thus separated by appropriate means, e.g., adsorbents or ion exchangers in order to remove fission products therefrom and re-supplying the carrier liquid thus purified to the circulating nuclear fuel suspension before its re-entrance into the nuclear reactor proper.

By "stable suspension" there should be understood in the present specification and in the appertaining claims a dispersion of solid matter in a carrier liquid in which substantially no agglomeration of particles occurs. It should be understood, in this connection, that the occurrence of the phenomenon of settling, the absence of which is sometimes considered as a stability criterion for suspensions, is not to be excluded with regard to the nuclear fuel suspensions according to the invention.

It has appeared that, when applying a nuclear fuel suspension according to the invention, a substantial part of the fission products mentioned hereinbefore, say, 80%, may leave the fissile material particles and are subsequently slowed down by and detained in the carrier liquid, so that purification of the carrier liquid, when temporarily separated from the circulating nuclear fuel suspension will entail the desired continuous purification of the nuclear fuel as a whole.

In a nuclear fuel suspension in which a substantial part of the suspended particles would have a maximum diameter that is greater than $15\mu$, fission products would largely be retained in the said particles and would hide from the possibility of continuous removal by means of purification of the carrier liquid and, consequently, periodical processing of the fissile material particles themselves would again become necessary.

As a consequence of the fact that in the process according to the invention, the bulk of the fission products immediately leaves the fuel particles and is detained in the carrier liquid, e.g., common or heavy water simultaneously acting as a moderator, there is a very efficient and speedy transfer of heat generated by the nuclear fission to the carrier liquid. Thus, when the power of the reactor increases there occurs an immediate temperature rise of the carrier liquid which entails decrease of the density of the carrier liquid, so that the amount of moderating liquid in unit volume decreases and the fission reaction is automatically curtailed. Thus, the process according to the invention is entirely self-regulating and no control means, e.g., cadmium rods as known in the art, are needed.

The criticality of the suspension particle dimension according to the invention may be demonstrated with the aid of experiments.

For instance, a suspension of $UO_2$ in water (volume ratio $UO_2/H_2O$:1/24) was exposed, while stirring, to a beam of thermal neutrons. Subsequently, there was added to the solution a gauge solution of a compound of any element of which radio-active atoms appear as a typical fission product of uranium. After separation of the suspended particles and the carrier liquid, there was added an equal amount of the particular gauge solution to the separated solid material and said solid material was brought into solution by chemical means, e.g., dissolution in nitric acid. Subsequently there was determined the $\beta$-emission of both the solution of the solid material and the carrier liquid, which is a measure of the amounts of the particular fission product under consideration, e.g., samarium, barium, caesium or iodine, retained in the fissile material and received in the carrier liquid.

In FIGURE 1 of the annexed drawings, there are shown the results of the said experiments for various dimensions of the $UO_2$-particles. Along the abscissa of the graph depicted in FIGURE 1 there is plotted the particle size in microns, along the ordinate, the amount of fission products retained in the solid material, expressed in percent of the total mass of fission products. As will be seen from the drawing, at a particle size of $15\mu$, less than 20% of the fission products is retained in the $UO_2$ particles and, thus, 80% thereof has been received in the carrier liquid. At particle sizes of $10\mu$ and less, even less than 10% of the fission products is retained in the particles and 90% thereof has been received in the carrier liquid. At particle sizes greater than $15\mu$, there is a strong increase in the amount of fission products retained in the particles, so that particle sizes of that kind are entirely unattractive for practical application in the present process.

It will be readily understood in connection with the foregoing explanation why the phenomenon of agglomeration should essentially not occur with the nuclear fuel suspension to be applied according to the invention. Lasting, or temporary, aggregations of fuel particles would, namely, simulate the presence of greater particles and a greater amount of fission products would be retained in the fuel particles and a smaller amount of fission products would be received in the carrier liquid. Consequently, purification of the carrier liquid would entail a less effective removal of fission products.

When applying a nuclear fuel suspension according to the invention, those fissionable nuclei which are formed by neutron capture and subsequent $\beta$-emission, e.g., $Pu^{239}$ or $U^{233}$, should preferably not be allowed to leave the solid fuel particles and be detained in the carrier liquid. Therefore, there is preferably used, according to the invention, a nuclear fuel suspension in which substantially all the suspended particles have a minimum diameter that is greater than $0.01\mu$.

The separation of the carrier liquid hereinbefore referred to may be carried out in any manner known in the pertinent art. However, it should be understood, that certain known manners of separation might be too cumbersome, e.g., as regards the time required for adequate separation, to be attractive for application in a continuous process as hereinbefore described.

Therefore, it is preferred, according to the invention, to apply nuclear fuel suspensions in which the mean effective diameter of the solid fuel particles is equal to or greater than $1\mu$. It has appeared, that from such suspensions, especially when a hydrocyclone thickener is applied, substantial amounts of carrier liquid may be easily separated in a relatively short time.

In the continuous process referred to, the circulating suspension, or part thereof, may be pumped into a hydrocyclone thickener, or battery of hydrocyclone thickeners, and the overflow fraction discharging therefrom, substantially consisting of carrier liquid may be purified. Subsequently, the purified liquid may be mixed with the apex fraction discharging from the said hydrocyclone thickener(s), which fraction consists of a more or less thickened fuel suspension, thus reestablishing a fuel suspension suitable for recirculation to the reactor.

Advantageously, the thickened nuclear fuel suspension from which part of the carrier liquid has been temporarily separated may be subjected to a rinsing treatment in order to remove fission products adsorbed to the suspended particles therefrom. In this way there is achieved an increased efficiency of the continuous removal of fission products during operation of the nuclear reactor.

The disposal of gaseous fission products and of gaseous decomposition products formed in those cases where water is utilized as the carrier liquid in the nuclear fuel suspension should be contemplated apart from the disposal of the fission products detained in the carrier liquid or adsorbed on the nuclear fuel particles as hereinbefore described. Said disposal of gaseous by-products of the nuclear fission reaction may be achieved in manners known in themselves, e.g., by recombination of the water decomposition gases and subsequent fixation of the gaseous fission products, e.g., by means of adsorbents.

The invention will be further illustrated by a description of an operative nuclear reactor assembly as shown in FIGURE 2 of the accompanying drawings.

In the drawing, the main circulation system for the nuclear fuel suspension comprises a reactor vessel 1, a pump 2, a heat exchanger 3, a gas separator 4 and connective conduits 5, 6, 7 and 8; the circulation is clockwise. The reactor vessel 1 is surrounded by a stack 9 of beryllium oxide bricks which is further embedded in a stack 10 of graphite bricks. The nuclear reactor proper is surrounded by a pressure tight steel vessel 11. The whole is arranged within a protective shield 12 consisting of concrete.

When the nuclear fuel suspension, e.g., consisting of solid uranium oxide particles in water as the carrier liquid is circulated in the manner indicated, critical conditions for a self-sustaining neutron chain fission reaction will prevail within the reactor vessel 1 as a consequence of the neutron-moderating properties of the suspension carrier liquid, the neutron-moderating and neutron-reflecting properties of the beryllium oxide pile 9, and the neutron-reflecting and neutron-moderating properties of the graphite pile 10. In the circulation system outside of the nuclear reactor proper conditions are non-critical. In the heat exchanger 3 the heat contained in the nuclear fuel suspension as a consequence of the nuclear chain fission reaction may be transmitted to a coolant and may subsequently be utilized in a power plant (not shown). In the gas separator 4, which is of the centrifugal type, gaseous fission products and the hydrogen and oxygen formed within the nuclear reactor as a consequence of the strong radiation are separated from the circulating suspension and are discharged through the conduit 13.

It will be appreciated that in the primary suspension circuit there are no valves whatsoever.

The primary suspension circuit is provided with an expansion vessel 14 which is directly coupled to the pump 2, which pump is operated by the motor 15. Said pump is of the centrifugal type so that if some liquid would enter the expansion vessel 14 in case of an incidental expansion of the suspension contained in the primary suspension circuit, no suspended particles will enter the expansion vessel 14, and thus there will be no accumulation of radio-active material within the expansion vessel.

As the operating temperature of the nuclear reactor is well above 100° C., e.g., 250°C., the suspension circuit is under considerable pressure in case common or heavy water is utilized as the suspension carrier liquid. In order to prevent boiling of the suspension carrier liquid there is applied to the suspension circuit a pressure substantially higher than the vapour pressure of the carrier liquid at the operating temperature chosen. This aim is achieved by gas from a pressure source 16 which by means of a conduit 17 communicates with the expansion vessel 14. In order to prevent leakage of the strongly radio-active suspension the same gas pressure is also applied to the interior of the pressure tight vessel 11 through conduits 17, 18 and 19; to the interior of the expansion vessel 14 and to the casing of the motor 15 through conduits 17 and 20; through the interior of the gas separator 4 through conduits 17, 21, 22, 23 and 24.

Continuous purification of the nuclear fuel suspension is achieved by feeding part of the circulating suspension, through conduits 25 and 26, to a hydrocyclone thickener 27. From said hydrocyclone thickener, a slightly thickened fuel suspension is discharged through conduit 28 and returned to the primary suspension circuit through conduit 29. Separated carrier liquid discharges from the hydrocyclone thickener 27 through overflow conduit 30 and flows, via conduits 31 and 32, to an ion exchange column 33, where fission products detained in the carrier liquid are removed therefrom. Subsequently, the purified carrier liquid is returned to the primary suspension circuit via conduits 34, 35 and 29. In order to ensure continuous removal of fission products from the separated carrier liquid, a second ion exchange column 36 may be switched into the carrier liquid circuit by operating valves 37, 38, 39 and 40. Before entering the ion exchange column 33 or 36, the separated carrier liquid is cooled by means of a heat exchanger 41 in order to counteract the detrimental influence of elevated temperature on the ion exchanger applied.

Furthermore, on its way from the hydrocyclone thickener 27 to the ion exchange column 33 or 36, the separated carrier liquid is led through a filter 42 in order to filter off very fine fissile material particles discharged from the hydrocyclone thickener 27 through the overflow thereof. Such fine particles which have been formed, e.g., by attrition from the bigger fissile material particles applied according to the invention, may be periodically drained from the filter 42 wherein they have accumulated by operating valves 43 and 44 and discharging the liquid through conduit 45 into dump tank 46.

The amount of fuel suspension continuously introduced into the purification circuit, and the amount of carrier liquid separated from the fuel suspension thus temporarily withdrawn from the primary suspension circuit, may be regulated by operating valves 47 and 48 which are provided in the overflow discharge conduit 30 and the thickened suspension discharge conduit 28, respectively, of the hydrocyclone thickener 27.

In order to be able to withdraw part of the fissile material from the circulating fuel suspension, and/or to supply fresh and/or modified fissile material to said suspension there has been provided a storage vessel 49. Part of the fuel suspension withdrawn from the primary suspension circuit through conduit 25 may be fed, through a conduit 50, to a hydrocyclone thickener 51, from which thickened suspension is discharged into storage vessel 49 and separated carrier liquid is discharged through overflow conduit 52 and subsequently returned to the primary suspension circuit through conduits 35 and 29. The amount of suspension thus treated is regulated by operating valve 55 in conduit 50. The thickening action of the hydrocyclone thickener 51 may be governed by operating valve 53 in overflow conduit 52. Solid material from the storage vessel 49 may be resupplied through conduits 56 and 29 to the primary suspension circuit by opening outlet valve 54 of the storage vessel 49 and simultaneously diluting the viscous material discharging therefrom by injecting carrier liquid in valve 54 through conduit 57. Fresh solid fissile material, and/or modified fissile material may be introduced into the system via storage vessel 49 by means of hopper 58 and conduit 59 provided with valve 60.

For the purpose of recombining gaseous dissociation products of the carrier liquid and disposal of gaseous fission products there has been provided a gas circulation system operating as follows.

The gas discharging from the gas separator 4 through conduit 13, consisting of the said products together with gas from the pressure source 16 introduced in the gas separator 4 through conduits 17, 21, 22, 23 and 24 is first led into the moisture filter 61 where liquid drops still present are separated, and liquid is fed back to the primary suspension circuit through conduit 62. The gas discharging from the moisture filter 61 flows through conduits 63 and 21 to a catalytic cell 64, where the hydrogen and oxygen present are recombined into water, which in the adjoining cooling aggregate 65 is condensed and flows back to the primary suspension circuit through conduits 66 and 62. Continuous criculation of gas from the pressure source 16 through the system consisting of gas separator 4, moisture filter 61, catalytic cell 64 and cooling aggregate 65 is achieved by means of blower 67.

For the purpose of disposal of gaseous fission products there is provided a by-pass of the said gas circulation system consisting of conduit 68, adsorption cartridge 69 and conduit 70. A second adsorption cartridge 71 with appertaining conduits 72 and 73 may be switched into the circuit by operating valves 74, 75, 76 and 77. In case of exhaustion or failure of the adsorption cartridges 69 or 71, gas carrying gaseous fission products may be bled to the stack 78 through conduit 79 provided with valve 80.

The gas flow rate in the gas circulation system may be regulated by operating valves 81 and 82.

As hereinbefore indicated, gas pressure is applied to the interior of the pressure tight steel vessel 11 surrounding the nuclear reactor proper, by means of pressure source 16 and connective conduits 17, 18 and 19. Additionally there is effected circulation of gas from the source 16 through the interior of the pressure tight vessel 11 under the action of a blower 83 and by means of a conduit 84 passing through the cover member 85 of the vessel 11. By the said gas circulation there is achieved cooling of the graphite pile 10 and the beryllium oxide pile 9 which are heated during operation of the nuclear reactor by dissipation of radiation energy. The circulating gas is cooled by means of a cooler 86.

In case of emergency, the inventory of the primary nuclear fuel suspension circuit may be rapidly drained in the dump tank 87 through conduit 88 by operating valve 89. The dimensions of the dump tank 87 are so chosen that when it is filled with the nuclear fuel suspension no critical conditions prevail for a self-sustaining neutron chain fission reaction.

By means of the cooler 90 there may be carried off heat originating from fission under the influence of delayed neutrons occurring after the fuel suspension has been drained into the dump tank 87.

The fuel suspension thus drained may be discharged from the dump tank 87 through conduit 91 by operating valve 92.

It will be appreciated that the nuclear reactor assembly shown does not involve separate control means, and that because the process concerned is entirely self-regulating as hereinbefore elucidated.

In order to obtain a satisfactory operation of the nuclear reactor it is essential that the concentration of the nuclear fuel suspension be optimum at any place within the reactor. This, however, is difficult to attain, as the solid fissile material rapidly settles in the carrier liquid on account of its high specific gravity. This will especially be the case at the high temperatures prevailing in the reactor, as at these temperatures the viscosity of the carrier liquid is low.

The application of stirrers or other elements with moving parts within the reactor, by means of which settling may be prevented, presents great difficulties in practice, as regular maintenance and repair at short notice is difficult or even impossible on account of the strong radiation in the reactor.

These difficulties can be completely overcome by making the fuel suspension flow upwardly in a continuous stream through the reactor vessel 1, which is provided with substantially vertical walls, in such a manner that turbulence in the suspension within the vessel is avoided as much as possible.

The carrier liquid will then ascend in the reactor vessel with a practically uniform vertical velocity throughout the cross-sectional area of the vessel, whereas the fuel particles suspended in the carrier liquid will reach, after a very short time, a constant settling velocity with respect to the carrier liquid, so that, at a constant concentration of the infed suspension and at a constant feed and discharge of the suspension to the reactor vessel there will be established a stationary state within the chamber, the fuel suspension at any given place in the vessel always keeping substantially the same concentration.

In order to attain this end it is essential that both the feed and the discharge of the fuel suspension to the reactor vessel 1 be so regulated as to prevent the establishment of horizontal currents. It is especially the feed which is critical in this respect.

Said feed may be effected by providing the base of the reactor vessel 1 with a network of substantially vertically disposed partitions. Below this network there is a feed chamber which, at least at the top, has substantially the same diameter as the reactor vessel. Said network of partitions damps any horizontal velocity components which may occur in the suspension flowing from the feed chamber, and, consequently, the establishment of horizontal currents within the suspension flowing into the reactor vessel is counteracted.

As the gas from the pressure source 16 there is preferably used hydrogen in those cases where common water is utilized as the suspension carrier liquid, and deuterium in those cases where heavy water is utilized for that purpose. As a result thereof, the circulating nuclear fuel suspension will become saturated with hydrogen or deuterium, respectively. Consequently, the dissociation of the water will be substantially reduced, as the dissociation equilibrium of common water resp. heavy water has appeared to be mainly determined by the hydrogen resp. deuterium concentration.

On the other hand, the use of hydrogen resp. deuterium for the said purpose promotes the recombination of the water dissociation products in the catalytic cell 64 as a consequence of the surplus of hydrogen resp. deuterium present in the circulating gas.

Essential data for operation of the nuclear reactor described are as follows—

Nuclear fuel: 10 kilograms of uranium dioxide, wherein 20% of the uranium atoms consist of the $U^{235}$ isotope; mean particle size $12\mu$.
Carrier liquid: 27 kilograms of common water.
Volume of primary fuel suspension circuit: 17 litres.
Rate of circulation of fuel suspension through primary circuit: 2 litres per second.
Volume of purification or secondary suspension circuit: 11 litres.
Overall thickness of beryllium oxide stack 9: 15 centimeters (specific gravity of beryllium oxide bricks 2.9).
Overall thickness of graphite stack 10: 33 centimeters.
Gas source 16: hydrogen with 50 atmospheres gauge pressure.
Maximum operation temperature of fuel suspension circulating in primary circuit: 250° C.
Control: self-regulation.
Maximum power output: 250 kilowatts.

I claim:
1. In a process for the establishment of a self-sustaining neutron chain fission reaction in a system comprising a nuclear fuel suspension of solid fissile material particles in a carrier liquid of low neutron capture cross section, which nuclear fuel suspension continuously circulates through a nuclear reactor wherein critical conditions prevail and through an external piping system including a heat exchanger, in which system non-critical conditions prevail, the improvement of applying a stable non-agglomerating nuclear fuel suspension in which suspension substantially all the suspended particles have a minimum diameter that is greater than 0.01 and have a maximum diameter that is smaller than $15\mu$ and continuously removing fission products from the nuclear fuel suspension by separating at least part of the carrier liquid from the suspension circulating through the external piping system, purifying the carrier liquid thus separated and resupplying the purified liquid to the circulating suspension.

2. Process according to claim 1, wherein, in the suspension, the mean effective diameter of the suspended particles is at least equal to $1\mu$.

References Cited by the Examiner
UNITED STATES PATENTS
2,743,225    4/56    Ohlinger et al. _____ 176—58

FOREIGN PATENTS
688,822    3/53    Great Britain.

OTHER REFERENCES
The Science and Engineering of Nuclear Power, Clark Goodman, vol. 1, Addison-Wesley Press, Cambridge, Mass., 1947, pages 303–309.

Nuclear Engineering, Part II, pub. by American Institute of Chemical Engineers, Chemical Engineering Progress Symposium, Series No. 12 (1954), vol. 50, pages 120–126 (an article by J. J. Went and H. De Bruyn).

CARL D. QUARFORTH, *Primary Examiner.*

WILLIAM G. WILES, ROGER L. CAMPBELL, LEON D. ROSDOL, REUBEN EPSTEIN, *Examiners.*